US008127286B2

(12) United States Patent
London

(10) Patent No.: US 8,127,286 B2
(45) Date of Patent: Feb. 28, 2012

(54) MSI ENHANCEMENT TO UPDATE RDP FILES

(75) Inventor: Kevin Scott London, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1191 days.

(21) Appl. No.: 11/707,613

(22) Filed: Feb. 16, 2007

(65) Prior Publication Data

US 2008/0201457 A1    Aug. 21, 2008

(51) Int. Cl.
 *G06F 9/44* (2006.01)
(52) U.S. Cl. ........ 717/169; 717/168; 717/174; 717/177; 709/222
(58) Field of Classification Search .......... 717/168–178; 709/222
See application file for complete search history.

(56) References Cited

U.S. PATENT DOCUMENTS

| 5,577,210 | A * | 11/1996 | Abdous et al. ................. 709/219 |
| 5,794,217 | A * | 8/1998 | Allen ............... 705/27 |
| 5,878,429 | A * | 3/1999 | Morris et al. ......................... 1/1 |
| 6,282,711 | B1 | 8/2001 | Halpern et al. |
| 6,675,382 | B1 * | 1/2004 | Foster .......................... 717/177 |
| 6,816,964 | B1 | 11/2004 | Suzuki et al. |
| 6,948,151 | B2 | 9/2005 | Gerken |
| 6,976,253 | B1 | 12/2005 | Wierman et al. |
| 7,111,060 | B2 * | 9/2006 | Araujo et al. ................. 709/224 |
| 2002/0087668 | A1 * | 7/2002 | San Martin et al. .......... 709/221 |
| 2002/0157089 | A1 * | 10/2002 | Patel et al. ...................... 717/178 |
| 2004/0088377 | A1 * | 5/2004 | Henriquez .................... 709/219 |
| 2005/0125788 | A1 | 6/2005 | Lupini et al. |
| 2005/0193389 | A1 | 9/2005 | Murphy et al. |
| 2005/0267972 | A1 | 12/2005 | Costa-Requena et al. |
| 2006/0080659 | A1 | 4/2006 | Ganji |
| 2006/0142878 | A1 | 6/2006 | Banik et al. |

OTHER PUBLICATIONS

Charles Border; The development and deployment of a multi-user, remote access virtualization system for networking, security, and system administration classes; ACM, 2007, pp. 576-580.*
Sjolin, Martin, "State Driven Software Installation for Windows NT", Date: Jul. 14-17, 1999, pp. 27-36, http://db.usenix.org/publications/library/proceedings/lisa-nt99/full_papers/sjolin/sjolin_html/.

* cited by examiner

*Primary Examiner* — Anna Deng
*Assistant Examiner* — Satish Rumpuria
(74) *Attorney, Agent, or Firm* — Mayer & Williams P.C.

(57) ABSTRACT

A Terminal Server Administrator is provided with the ability to indirectly update RDP files that have been placed inside an MSI file. The TS Web Access server retrieves the RDP file from the MSI file being published by the Active Directory, contacts the corresponding Terminal Server for any updated settings to the RDP file and icon allowing the remote program to be launched, and then passes the updated RDP file and icon to the client that is to connect to the Terminal Server. In this way RDP files can be dynamically updated without creating a new MSI file.

12 Claims, 4 Drawing Sheets

MSI ENHANCEMENT TO UPDATE RDP FILES

BACKGROUND

In a normal Terminal Services session, a user's applications reside on a terminal server rather than on the user's client terminal. When connected, the desktop of the remote machine will be displayed, and the user will interact with the remote terminal server. In this case, the user is basically using the server's operating system as his or her own. Accordingly, in this case the server's operating system knows about applications that are installed on the server. When a user runs a normal Terminal Services session, the user simply establishes a connection to the server using client software that communicates with the user using an appropriate protocol such as the Remote Desktop Protocol (RDP), for example.

RDP is a multi-channel protocol that allows a user to connect to a computer running Microsoft Terminal Services, which is a component of Microsoft Windows operating systems that allow a user to access applications or data stored on a remote computer over a network connection. Remote Desktop Protocol (RDP) files contain configuration information for the Terminal Services client on how to connect to a Terminal Server, and if applicable, which remote application or program to launch once connected.

In some cases however, running remote applications or programs works differently—while the remote applications are running on the server's operating system, the users do not use the server's operating system as their own operating system. Rather, the user clients are running their own individual copies of Windows, which contain links or menu icons to the remote programs. To implement this embodiment, Terminal Services Client software is installed on the client system, and the user client can go through TS Web Access. Alternatively, the user client can install an .msi file or can simply click on an RDP file that has been installed on their system. The user also must either have a link to the remote program, or can visit a TS Web Access site to access the remote program. This link will appear as either a shortcut on the user client's desktop, as an application on the user's Start menu, or as a link accessed by visiting a configured TS Web Access website. In the case of the RDP protocol, the file that acts as a link to the remote program uses the .RDP extension. To make the remote program available to users, the user clicks on the corresponding link. An MSI file can be created that allows file extensions to be taken over (e.g., double clicking on a .doc file opens up the associated remote program), the ability to add icons, add start menu entries, etc.

The use of an MSI file provides many advantages over manual installation of the RDP file. For example, with MSI files if a critical file for an installed application is deleted or damaged, the application can simply repair itself, which is a so-called self-healing benefit. The application used to create the MSI file needs to be able to "key" critical files, and then grabs the needed file from the original source, allowing the application to just keep running. Additionally, the creation of an MSI installation package allows for the distribution of the package using a group policy or other software deployment utility.

MSI files are structured as OLE Structured Storage Files, and are essentially relational databases packaged in installation packages that include installation information and the software files themselves, and are used by the Windows Installer engine for the installation, maintenance and removal of software on Microsoft Windows systems. As previously noted, MSI files essentially act as an installer for the RDP files. Without the MSI file (i.e., the database of all the files, settings, and configuration information for the associated application), Windows Installer cannot update configurations, install optional features, or apply software updates. Office cannot be installed, repaired, or updated if the MSI file is not found.

Using the Terminal Services Remote Programs command, MSI files may be created for the RDP files that have been configured to run remotely. This MSI installation package may then be used to deploy the remote program onto network clients. This allows administrators to maintain centralized control of applications, while still allowing users to retain their own individual desktops.

The MSI format integrates with a running Windows service, helping administrators deploy applications via Active Directory and Group Policy. Active Directory (AD) gives administrators a way to publish MSI files for the users in their organization. The use of AD gives the administrators a way to restrict groups of users in accessing certain groups of RDP files as well. Additionally, this capability helps deploy packages without requiring users to hold administrative credentials on the clients. Since users don't need administrative rights to install applications when the MSI format is used, security can be more readily maintained.

Unfortunately, once an RDP file is placed inside an MSI file there is no way to update that file without creating a new MSI file in which the updated RDP file is placed. Many times the person creating the RDP files for the Terminal Server will have administrator privileges for only the Terminal Server and not domain administrator privileges to update the MSI files that are being published through AD. This leads to the Terminal Server Administrator updating the RDP files, but the RDP files in the MSI files become outdated and in some cases unusable until the MSI files are re-created and re-published through AD.

This Background is provided to introduce a brief context for the Summary and Detailed Description that follows. This Background is not intended to be an aid in determining the scope of the claimed subject matter nor be viewed as limiting the claimed subject matter to only those implementations that may solve any or all of the disadvantages or problems presented above.

SUMMARY

It is desirable to leverage Active Directory for its ability to allow only certain user groups to access files—therefore, there is a need to allow RDP files contained in MSI files within AD to be updated without requiring domain administrator privileges.

In the context of a Terminal Services session, the Terminal Server Administrator is provided with the ability to indirectly update RDP files within MSI files. This is accomplished using a TS Web Access (TSWA) server to retrieve the RDP file from the MSI file being published by the Active Directory (AD). The TSWA then contacts the Terminal Server for any updated settings to the RDP file and then passes the updated RDP file to the client that is to connect to the Terminal Server. In this way, RDP files can be dynamically updated without creating a new MSI file.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in this disclosure.

DETAILED DESCRIPTION

Terminal services provide functionality similar to a terminal-based, centralized host, or mainframe environment in which multiple terminals connect to a host computer. Each terminal provides a conduit for input and output between a user and the host computer. A user can log on at a terminal, and then run applications on the host computer, accessing files, databases, network resources, and so on. Each terminal session is independent, with the host operating system managing multiple users contending for shared resources.

The primary difference between terminal services and the traditional mainframe environment is that the terminals in a mainframe environment only provide character-based input and output. A remote desktop client or emulator provides a complete graphical user interface, including a Microsoft Windows® operating system desktop and support for a variety of input devices, such as a keyboard and mouse.

In the terminal services environment, an application runs entirely on the terminal server. The remote desktop client performs no local execution of application software; The server transmits the graphical user interface to the client. The client transmits the user's input back to the server.

Figure 1:
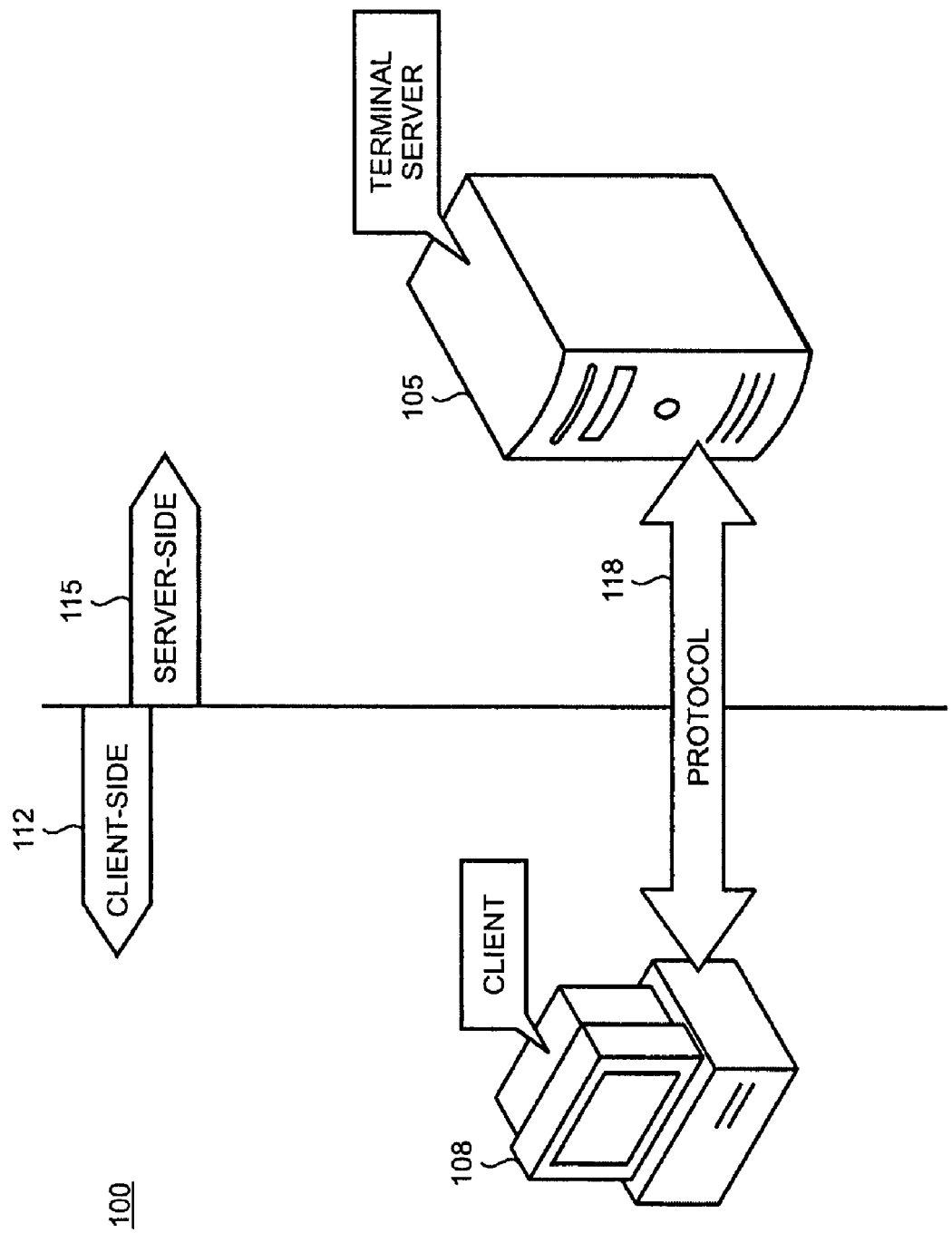
FIG. 1 is a diagram of an illustrative architecture supporting a terminal services session between a terminal server and a client computer.

Turning now to the figures where like reference numerals indicate like elements, FIG. 1 is a diagram of an illustrative architecture 100 supporting a terminal services session between a terminal server 105 and a client computer 108. Architecture 100 is divided into a client-side and a server-side, respectively, as indicated by reference numerals 112 and 115. Terminal server 105 on the server-side 115 operatively communicates with the client computer 108 on the client-side 112 using a terminal services protocol 118. In this illustrative example, the terminal services protocol 118 is arranged to use a Remote Desktop Protocol ("RDP") that typically operates over a TCP/IP (Transmission Control Protocol/Internet Protocol) connection between the client computer 108 and terminal server 105.

Terminal Services Web Access (TS Web Access) is a Windows Server "Longhorn" feature that lets administrators make Terminal Services Remote Programs (TS Remote Programs) available to users from a Web browser. With TS Web Access, users can visit a Web site (either from the Internet or from an intranet) to access a list of available Remote Programs. When they start one of these programs, a Terminal Services session is started on the terminal server that hosts the Remote Program (those skilled in the art will appreciate that while the discussion herein specifically refers to "TS Web Access", the inventive features are applicable to any web-based interface residing on a web server After an administrator installs TS Web Access on a Web server, users can connect to that server to access Remote Programs that are available on one or more terminal servers. Some additional benefits of TW Web Access includes the ability for users to access Remote Programs from a Web site over the Internet or from an intranet, wherein, to start a Remote Program, they click the program icon. Once the program is started, the remote program is seamless—it acts just like it is running on the local computer. In addition, if a user starts more than one Remote Program and the programs are running on the same terminal server, the programs run within the same Terminal Services session.

In addition, using TS Web Access greatly reduces the amount of administrative overhead, in that administrators can easily deploy programs from a central location, and since the programs are running on a terminal server, they are easier to maintain. TS Web Access provides a solution that works with minimal configuration, and, the list of available programs that appears to the user can be customized to a particular user if the TS Web Access is setup to obtain the programs from Active Directory, such that Active Directory provides the list of remote programs by serving up the MSI files that the particular user has privileges to access. to that user if administrators deploy Remote Programs MSI packages.

Figure 2:
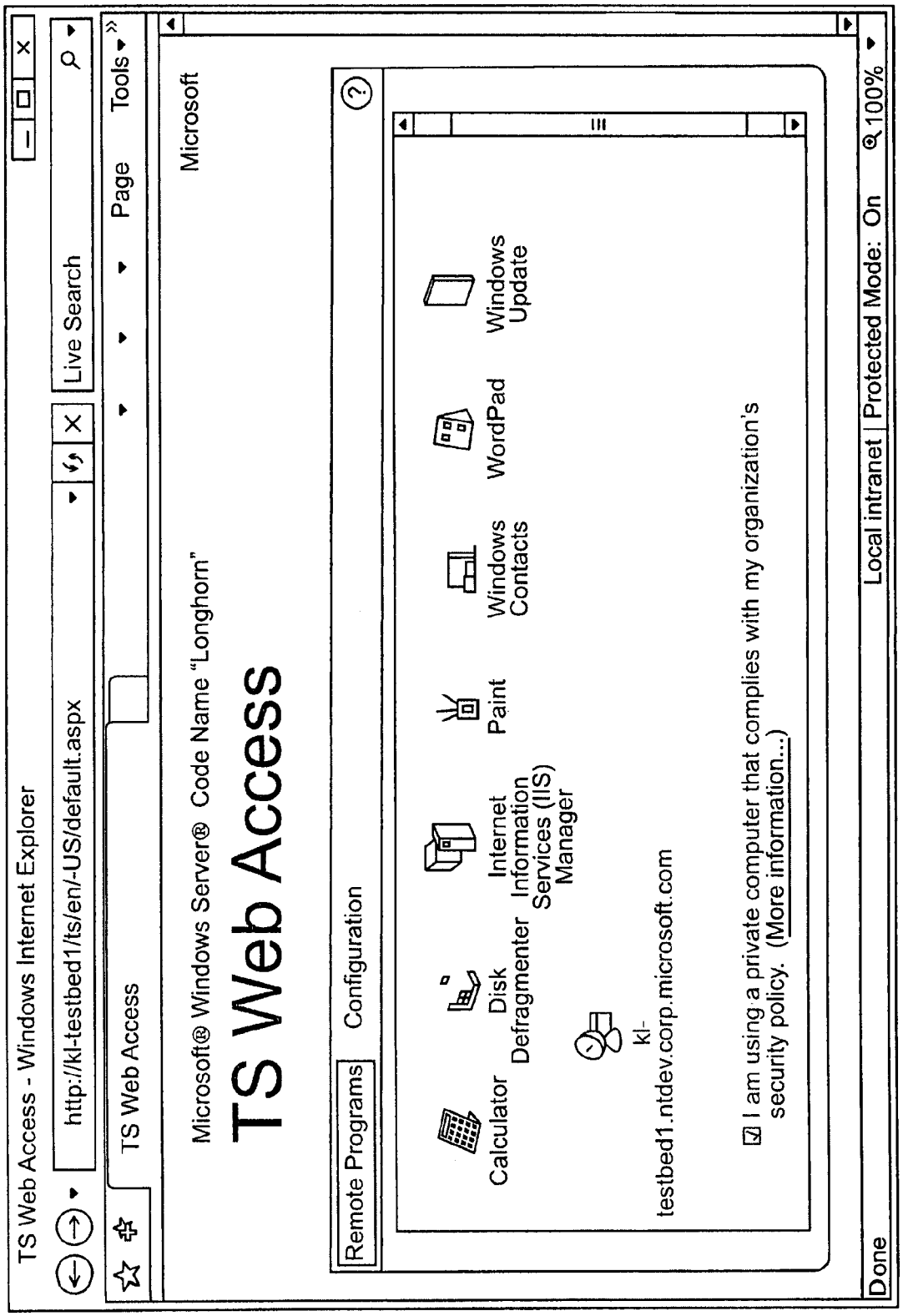
FIG. 2 is a an illustrative webpage that is shown when TS Web Access retrieves a list of programs from the Terminal Servers.

To summarize, TS Web Access is a Web Control embedded in an ASP.NET webpage that obtains lists of Remote Programs from the Terminal Servers and then displays a webpage, as indicated in the illustrative webpage shown in FIG. 2, which includes the list of Remote Programs and their Icons and also embedded RDP files that are served up to the ActiveX control when the Icon is clicked. As explained above, a user can then click on one of the Icons to launch that Remote Program. When the user opens up the TS Web Access website that is configured to populate the Remote Programs from Active Directory, the concepts described in detail herein come into play.

Figure 3:
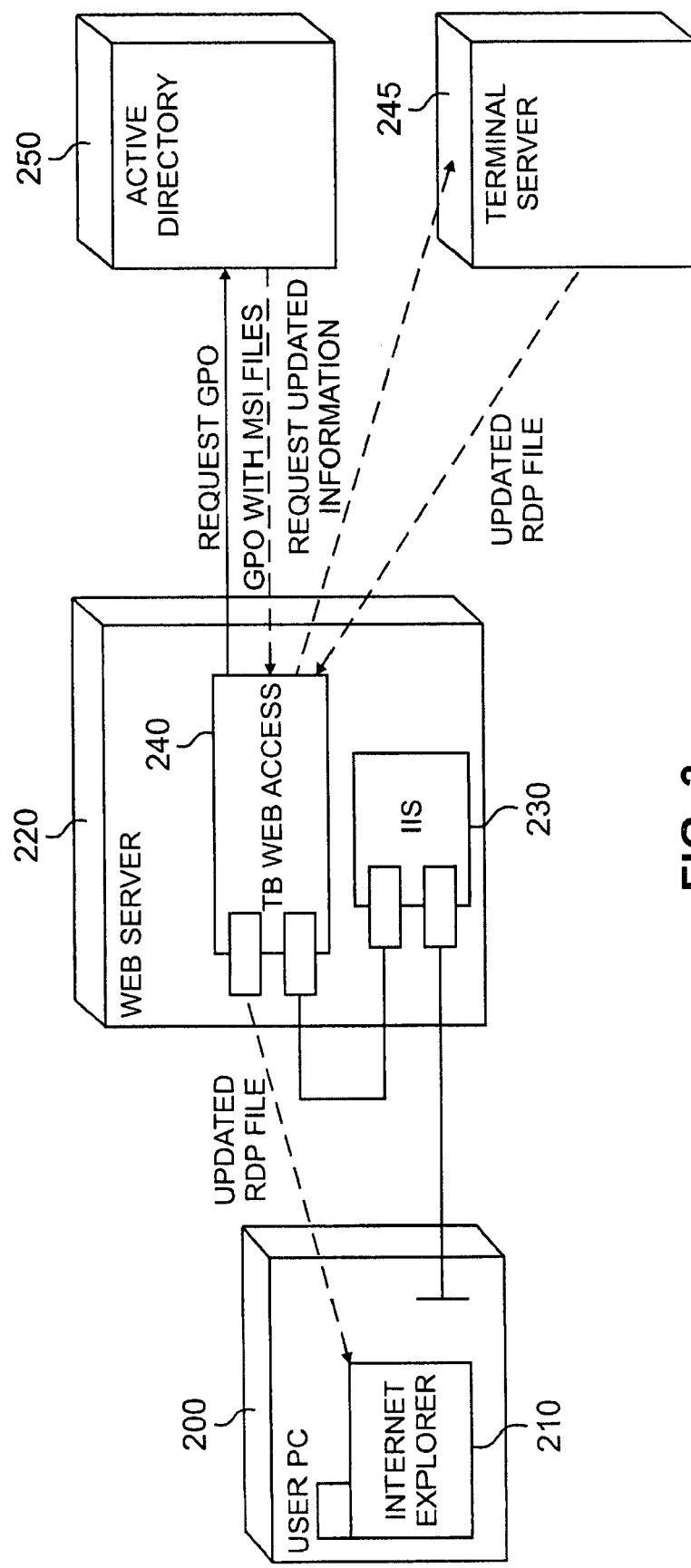
FIG. 3 is a simplified functional block diagram of an illustrative architecture that allows RDP files within an MSI file to be updated.

Turning now to FIG. 3, an exemplary architecture illustrates the components described herein which provide the ability to keep RDP files updated, without requiring domain administrator privileges. The flow chart of FIG. 4 further illustrates the steps performed in the architecture shown in FIG. 3.

As shown in FIG. 3, a user PC 200, including Internet Explorer 210, connects to Internet Information Services (IIS) 230 of Web Server 220. TS Web Access 240, part of Web Server 220, allows users to visit a Web site—either from the Internet or from an intranet—to access a list of available Remote Applications.

TS Web Access 240 determines, through Active Directory 250, if the user's Group Policy Object (GPO) as been cached. This GPO, again, provided from Active Director 250 to TS Web Access 240, includes links to the MSI files that contain the RDP files of the associated programs (again, those skilled in the art will appreciate that while "MSI" files are specifically referenced herein, any 'structured storage file' that includes RDP files can be implemented in the same manner). Once TS Web Access 240 retrieves the Remote Application list of MSI files, it can extract the first RDP file from the MSI file, parses the RDP file and obtains the server name that the RDP file points to. TS Web Access 240 can then connect to the Terminal Server, via Windows Management Instrumentation (WMI), to check if the first Remote Application is still on the Server.

WMI defines a unified architecture for describing, accessing, and instrumenting objects. Part of this architecture is a large database of WMI classes used to carry out remote management tasks on specific objects. A provider extends the WMI schema of classes to allow WMI to work with new types of objects. The Terminal Services Provider defines classes for querying and configuring Terminal Services.

TS Web Access 240 can determine if the Remote Application is enabled to be shown in TS Web Access. If a determination is made via WMI that the Remote Application is still on the Server and is enabled to be shown in TS Web Access, then TS Web Access 240 retrieves the updated RDP file from the Terminal Server 260. The icon is then pulled from the server and extracted from the corresponding MSI file (so that the icon will be updated as well if a new icon has been chosen by the TS Administrator or if the software is updated as has a new icon) and both the icon and the updated RDP file can be embedded in an HTML page rendered by TS Web Access 240 and provided to the user PC 200.

Figure 4:
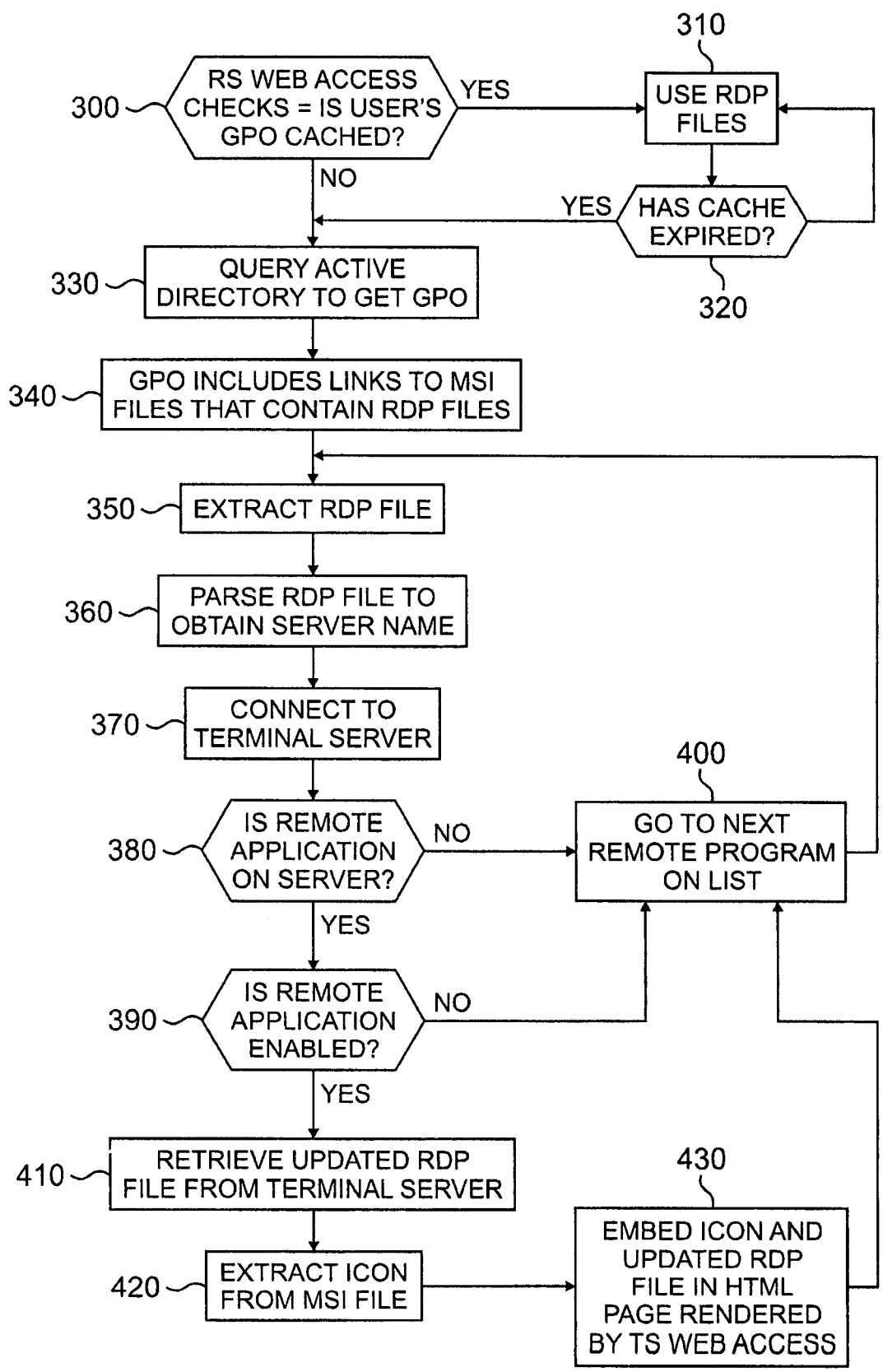
FIG. 4 is a flowchart illustrating a method for enhancing MSI files to reduce the staleness of RDP files contained therein.

Turning to FIG. 4, the method steps performed by the system described above in connection with FIG. 3, are now described.

First, in step 300, TS Web Access checks to see if that user's GPO has been cached. If it has been cached (step 310), TS Web Access uses the RDP files that are cached until they expire (step 310 continues to step 320, in which a determination is made if the cache has expired).

If the GPO has not been cached, or if a determination is made (step 320) that the cache has expired, TS Web Access 240 then queries the Active Directory 250 using Lightweight Directory Access Protocol (LDAP) to obtain the GPO associated with the user (step 330). This GPO, again, provided from Active Director 250 to TS Web Access 240, includes links to the MSI files that contain the RDP files of the associated programs.

Once TS Web Access 240 retrieves the Remote Application list of MSI files (step 340), it extracts the RDP file from the first MSI file on the list (step 350), parses the RDP file and obtains the server name that the RDP file points to (step 360). TS Web Access 240 then connects to the Terminal Server (step 370), via Windows Management Instrumentation (WMI), and checks to see if the first Remote Application is still on the Server (step 380).

If TS Web Access 240 determines, via the WMI connection to Terminal Server 260, that the Remote Application is still on the Server, TS Web Access 240 then determines if the Remote Application is enabled to be shown in TS Web Access (step 390).

Again, when a user starts a Remote Program, a Terminal Services session is started on the Terminal Server 260 that hosts the Remote Program. Terminal Server 260 provides an effective and reliable way to distribute Windows-based programs by making them available on a network server. With Terminal Server, a single point of installation allows multiple users to access the Terminal Server, allowing the users to run programs, save files, and use network resources as though they were sitting at that computer. TS Web Access 240 can populate the Terminal Services Remote Programs Web Page from either Active Directory Domain Services or a single terminal server.

Returning to the flowchart of FIG. 4, if either the Remote Application is not still on the Server (step 380), or if it is not enabled to be shown in TS Web Access (step 390), TS Web Access 240 continues on to the next MSI file on the list provided in step 340 (step 400) (starting with extracting the RDP file from the next MSI file).

If however, a determination is made that the Remote Application is still on the Server, and if it is enabled to be shown in TS Web Access, then TS Web Access 240 retrieves the updated RDP file from the Terminal Server 260 via WMI (step 410).

The icon is then extracted from the corresponding MSI file (step 420) and both the icon and the updated RDP file are embedded in the HTML page that is then rendered by TS Web Access 240 and provided to the user PC 200 (step 430) (both of steps 410 and 420 are accomplished with only one WMI call—i.e., if the application is in fact enabled to be shown in TS Web Access (step 390), the updated RDP file (illustrated in step 410) and the Icon file (illustrated in step 420) are both provided).

Accordingly, the Terminal Server Administrator is essentially provided with the ability to indirectly update RDP files by using TS Web Access to retrieve the RDP file from the MSI file being published by the Active Directory, contacting the corresponding Terminal Server for any updated settings to the RDP file and then embedding the updated RDP file and the icon in the HTML page that is then rendered by TS Web Access—this allows RDP files to be dynamically updated without creating a new MSI file.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The words "exemplary" and "illustrative" are used herein to mean serving as an example, instance, or illustration. Any implementation or aspect thereof described herein as "exemplary" or "illustrative" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A method of using a web-based interface residing on a web server to update a structured storage file associated with a remote program requested by a client, the method comprising the steps of:
   extracting a first file containing a link to the requested remote program from the structured storage file;
   parsing the first file to obtain a name of a second server to which the first file points;
   connecting to the second server;
   determining if the remote program identified in the first file is on the second server and is enabled to be shown in the web-based interface, wherein if the remote program is on the second server and if the remote program is enabled to be shown in the web-based interface, obtaining an updated first file from the second server;
   extracting an icon from the structured storage file, said icon allowing the remote program to be launched; and embedding the icon and the updated first file in a HyperText Markup Language (HTML) page that is rendered by the web-based interface
wherein said web-based interface residing on the web server is compliant with a Terminal Services Web Access (TS Web Access) protocol, and wherein the first file is compliant with a Remote Desktop Protocol (RDP) protocol, and wherein the structured storage file includes a Microsoft Installer (MSI) file.

2. The method of claim 1, wherein said RDP file contains configuration information including how to connect to the server.

3. The method of claim 2, wherein said RDP file contains information including which remote program to launch once connected.

4. The method of claim 1, further comprising the step of retrieving the structured storage file from Active Directory.

5. The method of claim 4, wherein said Active Directory is configured to selectively limit the ability of users to access the files therein.

6. A module, residing on a web server, for updating Remote Desktop Protocol (RDP) files within an MSI file associated with a remote program requested by a client, said module comprising:
a parser for parsing an RDP file associated with a Microsoft Installer (MSI) file to obtain a name of a server to which the RDP file points;
an interface for connecting to said server;
a program-identifying component for determining if a remote program identified in the RDP file is on said server, and wherein if the remote program is on the server and if the remote program is enabled to be shown in the module, obtaining an updated version of the RDP file and an icon allowing the remote program to be launched from said server;
an embedding component for embedding the icon and the updated RDP file in a HyperText Markup Language (HTML) page and rendering said HTML page;
an interface for connecting to Active Directory and querying said Active Directory to obtain information including links to MSI files that contain the RDP files associated with the requested remote program; and
an extraction component for extracting the RDP file from the MSI file.

7. The module of claim 6, wherein said module comprises Terminal Services Web Access (TS Web Access).

8. The module of claim 6, wherein said RDP file contains configuration information including how to connect to the server.

9. The module of claim 8, wherein said RDP file contains information including which remote program to launch once connected.

10. A method of using Terminal Services Web Access (TS Web Access) to enhance Microsoft Installer (MSI) files to update Remote Desktop Protocol (RDP) files within MSI files, the method comprising the steps of:
parsing an RDP file to obtain a name of a server to which the RDP file points;
connecting to said server;
determining if a remote program identified in the RDP file is on said server, wherein if the remote program is on said server, and if the remote program is enabled to be shown in TS Web Access, obtaining an updated RDP file, and an icon allowing the remote program to be launched, from said server;
embedding the icon and the updated RDP file in a HyperText Markup Language (HTML) page;
rendering said HTML page;
retrieving a Group Policy Object (GPO) associated with the user, with links to MSI files that contain the RDP files, from Active Directory prior to said parsing step; and
extracting the RDP file from the MSI file.

11. The method of claim 10, further comprising the step of querying Active Directory to obtain a list of links to MSI files that contain RDP files.

12. The method of claim 11, further comprising repeating the steps recited for each of the remote programs included on said list.

* * * * *